United States Patent [19]
Yamazaki et al.

[11] 4,257,697
[45] Mar. 24, 1981

[54] PROJECTING MEMBER CARRIED BY THE BASE PLATE FOR CAMERAS

[75] Inventors: Keiji Yamazaki; Toshio Kobori, both of Sakai, Japan

[73] Assignee: Minolta Camera Kabushiki Kaisha, Osaka, Japan

[21] Appl. No.: 76,036

[22] Filed: Sep. 17, 1979

[30] Foreign Application Priority Data

Sep. 19, 1978 [JP]   Japan ............................ 53-127638[U]

[51] Int. Cl.³ ...................... G03B 17/00; G03B 19/12
[52] U.S. Cl. .................................... 354/152; 354/288
[58] Field of Search ................ 354/288, 202, 150–158, 354/245–247

[56] References Cited

U.S. PATENT DOCUMENTS

| | | | |
|---|---|---|---|
| 2,931,072 | 4/1960 | Yoshida | 354/156 |
| 3,257,922 | 6/1966 | Maitani | 354/156 |
| 3,299,931 | 1/1967 | Kritzler | 354/288 X |
| 3,580,154 | 5/1971 | Ettischer | 354/153 |
| 4,067,032 | 1/1978 | Yoshikawa et al. | 354/288 |
| 4,068,246 | 1/1978 | Arai | 354/152 X |

*Primary Examiner*—Donald A. Griffin
*Attorney, Agent, or Firm*—Wolder, Gross & Yavner

[57] ABSTRACT

A mounting structure for levers and the like such as in a reflex camera mirror box includes a metal base plate which may be the wall of the box and one or more tongues stamped from and bent outwardly perpendicular to the base plate and a synthetic organic polymeric resin having low friction and low light reflectivity properties molded to integrally form a layer on the base plate inside face, portions to fill the openings in the plate left by the tongues and externally cylindrical sheaths at least partially enveloping the tongues and functioning as reinforcing cores and defining projections which serve as pivots for swingably supporting levers, as lever stop abutments or for other functions. Where a projection is exposed to little stress, the core tongue may be omitted and by providing recesses in a tongue circumferential surface, the connection of the sheath to the plate covering resin layer may be omitted.

14 Claims, 13 Drawing Figures

PROJECTING MEMBER CARRIED BY THE BASE PLATE FOR CAMERAS

BACKGROUND OF THE INVENTION

The present invention relates generally to improvements in the construction and mounting of stationary projecting mechanical elements and it relates particularly to an improved camera structure including plate mounted projections functioning as pivots, axles, stop elements and the like.

The conventional photographic camera generally includes numerous projecting elements which serve various functions such as pivots or axles for rotating or rocking members such as levers or the like, stop members and other functions. These projecting elements as will be hereinafter described in detail, are conventionally separate elements which are mounted or anchored to a support plate and result in a structure or assembly which possesses numerous drawbacks and disadvantages. Many of these projecting elements under normal use are frequently highly stressed as are their connection to the support plate and such repeated stress often deforms the projecting element or separates it from the support plate and consequently damages the camera mechanism and impairs its operation. Moreover, the construction of the assembled structure of support plate and projecting elements is an expensive, awkward and time and labor consuming procedure which results in increased costs and otherwise leaves much to be desired.

SUMMARY OF THE INVENTION

It is accordingly a principal object of the present invention to provide an improved structure including a base plate and one or more projecting elements which serve as pivot pins or axles for rockably or rotatably supporting levers or the like, as stop-defining abutments or for other functions.

Another object of the present invention is to provide an improved base plate supported projecting element structure in which the projecting elements may be subjected to repeated high stresses without deforming or loosening the projecting elements or separating them from the base plate.

Still another object of the present invention is to provide an improved structure including a base plate and a plurality of projecting elements functioning as pivot pins, stops and the like which structure may be simply and inexpensively fabricated at greatly reduced costs.

A further object of the present invention is to provide an improved structure of the above nature which is applied to photographic cameras to great advantage and is characterized by its ruggedness, simplicity, high reliability, ease, efficiency and low cost of production and high versatility and adaptability.

The above and other objects of the present invention will become apparent from a reading of the following description taken in conjunction with the accompanying drawings which illustrate preferred embodiments thereof.

A structure in accordance with the present invention includes a metal base plate having an opening formed therein and a tongue stamped from the plate and integral therewith and projecting outwardly from a first face thereof adjacent the area of said opening and a polymeric resin overlying the plate opposite face and projecting through the opening and extending along the length of the tongue to form thereon a stationary sleeve with a cylindrical external face. The tongue functions as a high-strength core reinforcing the sleeve and functions with the sleeve as a pivot pin or axle or other element which is firmly affixed to the base plate and is capable of withstanding repeated high stresses and is easy and convenient to fabricate. Moreover, when the structure is used in a camera, for example, as part of a reflex mirror box mechanism, the polymeric resin overlying the base plate first or inside face may be of low light reflectivity. In the event that a projecting element of the improved structure is not highly stressed the respective tongue may be obviated and the resin projecting beyond the base plate opening is molded into a solid body or cylinder. In an alternative construction, a recess is formed in a side edge of the tongue and the sleeve molded thereto is locked in a fixed position without the need for any other anchoring connection.

The improved structure is highly reliable and rugged and capable of withstanding repeated high stresses, is easy, convenient and inexpensive to fabricate and is of high versatility and adaptability.

DESCRIPTION OF THE PREFERRED EMBODIMENTS

Figure 1:
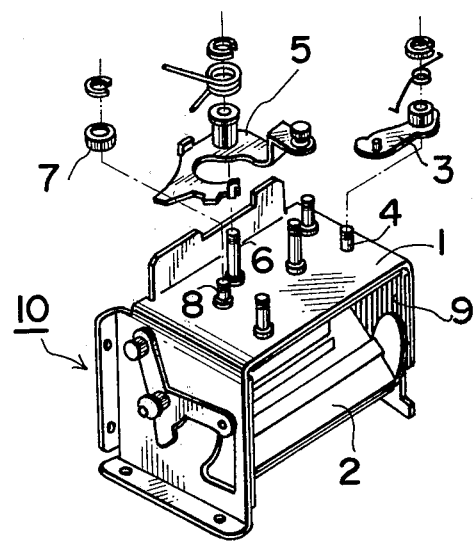
FIG. 1 is an exploded perspective view of a single lens reflex camera mirror box of conventional construction.

In FIGS. 1, 2(a), 2(b) and 2(c) of the drawings which illustrate a single lens reflex camera mirror box of conventional construction, the reference numeral 10 generally designates the overall mirror box which comprises a U-shaped metal frame cross piece defining a base plate 1 and parallel side legs between which a swingable mirror 2 is mounted, an upwardly directed pivot pin or post 4 being located in base plate 1 and swingably supporting a light spring loaded locking lever 3. The load or stress imparted to pivot pin 4 is relatively small so that pivot pin 4 as well as its mounting can be of relatively low strength. In contrast, a mirror drive lever 5 which is loaded by a heavy spring is swingably supported by a pivot pin 6 located on base plate 1, the pivot pin 6 is relatively highly stressed and the strength of pivot pin 6 and its mounting must accordingly be great. Moreover, a vertical post 8 which is likewise located on base plate 1 must be of great strength and firmly mounted since it supports a stop element defining sleeve in the path of movement of drive lever 5.

Figures 2A, 2B, 2C:
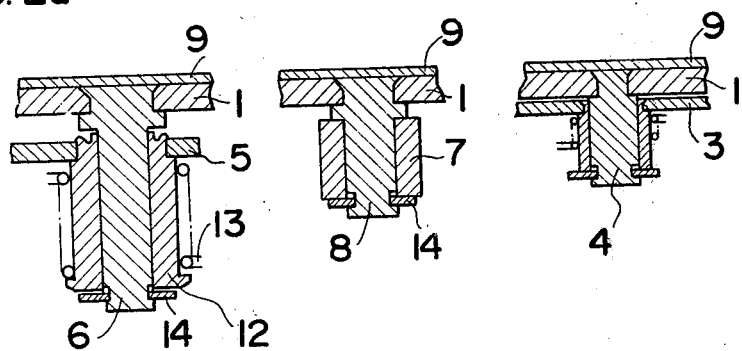
FIG. 2(a) is a fragmented sectional view of the pivot pin projection of the mirror box of FIG. 1 rockably supporting a drive lever.
FIG. 2(b) is a fragmented sectional view of the drive lever stop defining projection of the mirror box of FIG. 1.
FIG. 2(c) is a fragmented sectional view of the interlocking lever pin supporting projection of the mirror box of FIG. 1.

As seen in FIG. 2(a), the pins 4, 6 and 8 are individual separate members each of which engages at its base a corresponding opening in base plate 1 and is affixed thereto by enlarging the base end of the respective pins. The pivot pin 6 swingably supports drive lever 5 by way of a bearing collar 12 secured to lever 5 and engaging pivot pin 6 and restricted with lever 5 against axial movement by a split locking or C-ring 14 engaging a peripheral groove in the outer end of pivot pin 6. A hairpin drive spring 14 includes a helix engaging bearing 12 and arms engaging drive lever 5 and a fixed member to load lever 5. Stop member 7 is supported by pin 8 and locked thereto by split ring 14 engaging an end peripheral groove in pin 8 and the pin is anchored to base plate 1 in the manner of pin 6. Locking lever 3 is provided with a collar bearing which engages pivot pin 4 and is split ring locked thereto, the pin 4 being anchored in the manner of pins 6 and 8. The inside face of the mounting frame including base plate 1 is covered by a high light absorbtion or low light reflective panel 9.

With the above conventional construction, each of the pins 4, 6 and 8 must be individually attached and anchored to base plate 1 in fabrication. Moreover, due to the heavy loads or stresses normally imparted to the pins 4, 6 and 8, there is a strong possibility of deforming these pins and of loosening the anchoring of the pins to the base plate and separating these from the base plate with the resulting impairment of the operation of the mechanism.

Figure 3A:
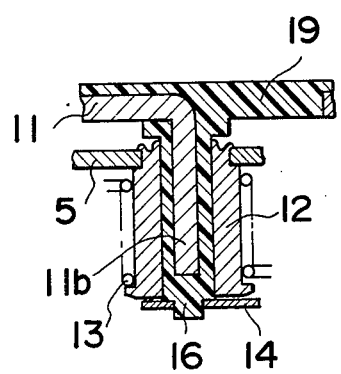
FIGS. 3(a), 3(b) and 3(c) are inverted sectional views of components of a structure embodying the present invention and corresponding to those illustrated in FIGS. 2(a), 2(b) and 2(c), respectively.
Figure 3B:
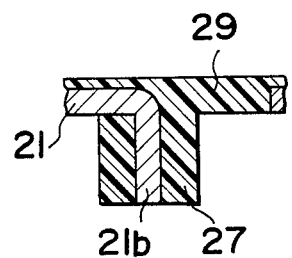
Figure 3C:
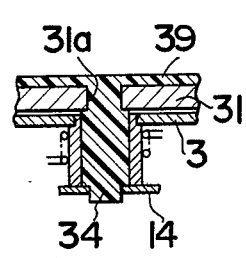
Figure 4A:
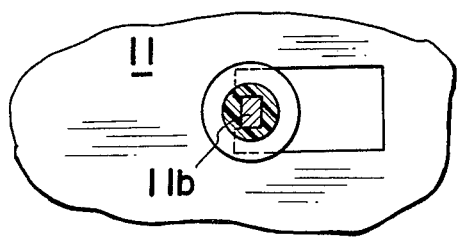
FIGS. 4(a) and 4(b) are transverse sectional and perspective views, respectively, of the improved projection structure of FIG. 3(a) in which a tongue is integrally formed from the base plate and is ensheathed by an externally cylindrical collar molded thereto.
Figure 4B:
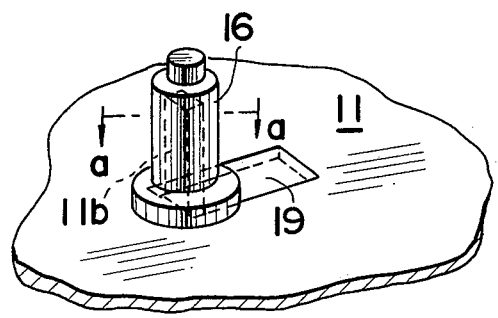

Referring now to FIGS. 3(a), 3(b) and 3(c) which illustrate a preferred embodiment of the present invention as applied to a single lens reflex camera box of the nature shown in FIG. 1, the sections shown in FIGS. 3(a), 3(b) and 3(c) correspond to and serve the functions of the sections shown in FIGS. 2(a), 2(b) and 2(c), respectively but avoid the various drawbacks and disadvantages thereof.

Specifically, the structure of section (a) includes a metal base plate 11 in which is stamped or otherwise cut a U-shaped slot or slit delineating a high strength reinforcing core defining tongue 11b which is bent outwardly to form a projecting element perpendicular to base plate 11 and leave a rectangular opening in base plate 11. The tongue 11b is integral with base plate 11 and projects therefrom at an edge the opening therein. A synthetic organic polymeric resin 19 of any suitable composition of low frictional resistance and advantageously of low light reflectivity or high light absorbtion is molded in a known manner to overlie the inside face of base plate 11 opposite projecting tongue 11b, fill the opening in base plate 11 and completely tightly and firmly ensheath tongue 11b. The portion of resin 19 ensheathing reinforcing core 11b is of external circular cylindrical configuration coaxial with core 11b, and with core 11b defines a pivot pin or projection 16. The base of the resin sheath of projection 16 is enlarged and the outer end of the sheath terminates in a coaxial stub of reduced diameter. The projection 16 is of great strength by reason of the high strength core 11b integrally formed with base plate 11 and is easily and inexpensively fabricated and it efficiently supports a rotating or swinging member by reason of the low friction characteristics of the resin sheath.

In the application of the projection pivot 16 in mounting the lever 5, a tubular or collar bearing 12 affixed to the lever 5 coaxially engages pivot 16 and is restricted against axial movement by a split lock ring 14 firmly engaging the end stub of pivot 16. The coil of loading spring 16 is wound about bearing 12 as in the conventional mechanism.

The stop member defining projection 27 shown in section (b) serves the function of the conventional stop 7 described earlier and is constructed in the manner of pivot 16. Specifically, a U-shaped slit or slot is stamped in a base plate 21 to delineate a short tongue 21b which is outwardly bent perpendicularly to base plate 21. Resin 29 is molded along the inside face of base plate 21 through the opening therein and about the reinforcing tongue or lever 21b. The resin 29 extends only for the length of core 21b and forms therewith a strong, firmly anchored shock resistant stop member.

The pivot support for lever 3 is subjected to relatively low stress and need not be as strong as pivot 16 and is, accordingly, constructed without a reinforcing tongue. As seen in section (c), the base plate 31 has an anchoring opening 31a formed therein and the resin 39 is molded to overlie the inside face of base plate 31 fill the opening 31a and form a cylindrical axle or pivot 34 coaxial with and of greater diameter than opening 31a and having an inner annular shoulder firmly abutting base plate 31 and terminating in a short stub. In application, the collar bearing of lever 3 engages pivot 34 and is prevented from axial movement by split ring 14 engaging the pivot end stub.

Figure 5A:
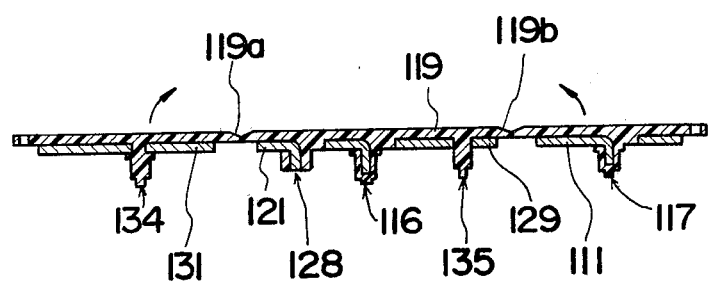
FIG. 5(a) is a longitudinal sectional view of another embodiment of the present invention provided with a plurality of projection members in which the base plate is shown in its flat condition.
Figure 5B:
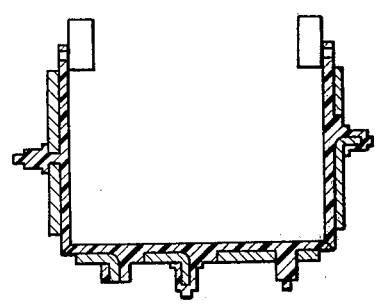
FIG. 5(b) is a view similar to FIG. 5(a) but with the base plate formed into a box shape.

It should be noted that resins 19, 29 and 39 may advantageously be common and integrally formed and the base plate sections 11, 21 and 31 may likewise be integrally formed of a common plate. Thus, FIGS. 5(a) and 5(b) illustrate another embodiment of the present invention in which the projections 16, 27 and 34 shown in FIGS. 3(a), (b) and (c), respectively, are mounted on the mirror box of a camera, such projections being integrally molded with the low light reflectivity wall lining the inside surface of the mirror box to provide a high reflection prevention efficiency. Specifically, pivot projections 134 and 135 which require little strength are of the same type as shown in FIG. 3, section (c). In contrast, projection 128 functions as a lever stop, thus requiring great strength and is of the type shown in FIG. 3, section (b). In addition, projections 116 and 117 function as pivots or axles which require great strength and are of the type of construction shown in FIG. 3, section (a). Reference numerals 111, 121 and 131 designate respective metal base plates, and 119 is a polymeric resin wall with a surface having a high light reflection prevention efficiency and lining the inside faces of the base plates and molded integrally with the various projections. Transverse V-shaped grooves 119a and 119b are formed in the wall 119, and when the wall is bent about these grooves in the directions of the arrows, a mirror box as shown in FIG. 5(b) may be formed.

Figure 6:
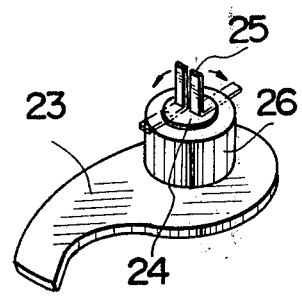
FIG. 6 is a perspective view of a lever projection assembly in accordance with another embodiment of the present invention.

FIG. 6 is a perspective view of still another embodiment of the present invention wherein a tongue stamped and bent from a base plate forms the reinforcing core member of a projection member and is also used as a stop member. Specifically, a fork-shaped outwardly projecting tongue 25 formed by bending a stamped part of a base plate is imbedded in pivot projection 24 molded of a plastic material as described above. The fork-shaped tongue 25 is pre-formed slightly longer than the length of and projects beyond projection 24, and after bearing 26 of lever 23 is brought into engagement with shaft 24, the projection tip of tongue 25 is bent at substantially a right angle as shown by the arrow. Since bearing portion 26 of lever 23 is engaged by the bent tip, the lever 23 is retained on the shaft 24. Accordingly, in the above embodiment, a split ring or other members for preventing the removal of lever 23 from pivot projection 24 is not required to be separately provided, thereby further reducing the required number of parts.

Figure 7:
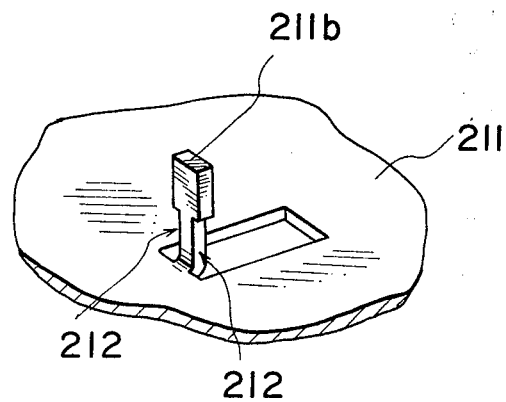
FIG. 7 is a fragmentary perspective view of a component of a further embodiment of the present invention.

In the above described embodiments, inasmuch as the bent or tongue portion used as the reinforcing core of the projecting member has flat circumferential surfaces, the plastic sheath should be molded so as to envelope or engage a part of the base plate together with the bent or tongue portion itself in order to prevent the molded plastic forming the projection member from coming off the tongue portion. FIG. 7 shows another embodiment of the present invention in which there is no necessity to engage a part of base plate to prevent the separation of molded plastic. In FIG. 7, core defining bent or tongue portion 211b, which is formed in the manner described earlier, is provided with recess portions 212 in its circumferential surface. Therefore, upon forming the projection member, plastic material may be molded so as to only ensheath or envelop the bent portion 211b without enveloping or engaging any other part of base plate 211. Such molded plastic which forms the projection member cannot separate from the bent or tongue portion 211b since the plastic enters or penetrates the recess portion 212.

As described above, according to the present invention, a bent piece of a base plate projecting outwardly therefrom as a tongue has molded thereon an ensheathed reinforcing and mounting core a cylindrical envelope of polymeric resin to form a projection member like a pivot, axle or the like. This structure greatly simplifies the mounting of a projection member on a base plate. In addition, the strength of a projecting member against a load is greatly enhanced, leading to an improved assembly efficiency and cost reduction and a superior mechanism.

While there have been described and illustrated preferred embodiments of the present invention, it is apparent that numerous alterations, additions and omissions may be made without departing from the spirit thereof.

We claim:

1. A motion transmission mechanism comprising a base plate, a pivot member located on and projecting outwardly from said base plate and a rotatable member rotatably supported on said pivot member, said mechanism being characterized in that said pivot member includes a core defining tongue cut and bent from and integral with said base plate and a synthetic polymeric resin sheath at least partially enveloping said tongue and having a cylindrical circumferential face along at least part of the length thereof, and being anchored against axial movement along said tongue.

2. The mechanism of claim 1 wherein said base plate has a first opening therein adjacent to said tongue and further comprising a synthetic organic polymeric resin layer overlying the inside face of said base plate and integrally formed with said sheath through said opening.

3. The mechanism of claim 2 wherein said base plate has a second opening formed therein displaced from said first opening and further comprising a second pivot member integrally formed with said resin layer and projecting outwardly through said second opening and a second rotatable member rotatably engaging said second pivot member.

4. The mechanism of claim 1 wherein said tongue has a recess formed in a circumferential face thereof and said sheath forming resin engages said recess to anchor said sheath to said tongue.

5. The mechanism of claim 1 wherein said rotatable member comprises a lever including a tubular bearing section coaxially engaging said pivot member and further comprising spring means biasing said lever to swing in an advanced direction and a stop member located in the path of advance movement of said lever and including a second tongue cut and bent from said base plate and a second synthetic organic polymeric resin sheath at least partially enveloping said second tongue and anchored against axial movement along said tongue.

6. The mechanism of claim 1 wherein said rotatable member includes a bore engaging said pivot member and said sheath projects outwardly of said bore and further comprising a split ring engaging the outer portion of said sheath and limiting the axial movement of said rotatable member.

7. The mechanism of claim 1 wherein said rotatable member includes a bore engaging said pivot member and said tongue projects outwardly beyond said bore and said sheath and terminates in a radially projecting leg overlying the end of said sheath and said rotatable member to limit the axial movement of said rotatable member.

8. A camera structure including a subassembly unit having a base plate made of metallic material and a projecting member, said projecting member comprising:
a bent-up tongue portion formed as an integral part of said base plate by bending up a part of said base plate; and
an envelope member overlying at least a part of said base plate and including an integrally formed post surrounding at least a part of said bent-up portion which serves as a core for said post said envelope member being made of plastic material.

9. A camera structure as set forth in claim 8 wherein said camera structure includes a lever and said post includes a supporting portion having the shape of a column for pivotally supporting said lever.

10. A camera structure as set forth in claim 8 wherein said camera structure includes a movable member and said envelope member includes a stopper portion engageable with said movable member to stop said movable member.

11. A camera structure as set forth in claim 8 wherein said bent-up portion is provided with a recess at its circumference.

12. A camera structure as set forth in claim 8 wherein said camera structure includes a reflex mirror and a mirror box for supporting and surrounding said reflex mirror, said base plate is formed as a wall of said mirror box and said envelope member extends to cover interior wall of said mirror box and is formed with a serrated surface.

13. A camera structure including a subassembly unit having a base plate made of metallic material and a projecting member, said projecting member comprising:

a bent-up portion formed as an integral part of said base plate by bending up a part of said base plate; and an envelope member surrounding a part of said base plate and said bent-up portion which serves as a core for said envelope member, said envelope member being provided on said bent-up portion with leaving a top end portion of said bent-up portion uncovered.

14. A camera structure as set forth in claim 13 wherein said top end portion is of the shape of fork.

* * * * *